US012730852B2

(12) United States Patent
Goodman Gu et al.

(10) Patent No.: US 12,730,852 B2
(45) Date of Patent: Sep. 8, 2026

(54) RANKING OF CONTENT BASED ON IMPLIED RELATIONSHIPS

(71) Applicant: Apple Inc., Cupertino, CA (US)

(72) Inventors: Xiaoyuan Goodman Gu, San Jose, CA (US); Yuan Yen Tai, Pleasanton, CA (US); Moliang Zhou, Santa Clara, CA (US); Dayvid Victor Rodrigues de Oliveira, Round Rock, TX (US); Brian Knott, New York City, NY (US); Jin Cao, Ardsley, NY (US); Jia Huang, Mountain View, CA (US)

( * ) Notice: Subject to any disclaimer, the term of this patent is extended or adjusted under 35 U.S.C. 154(b) by 0 days.

(21) Appl. No.: 18/458,817

(22) Filed: Aug. 30, 2023

(65) Prior Publication Data

US 2024/0281490 A1 Aug. 22, 2024

Related U.S. Application Data

(60) Provisional application No. 63/486,011, filed on Feb. 20, 2023.

(51) Int. Cl.
*G06F 16/00* (2019.01)
*G06F 16/951* (2019.01)
*G06F 16/954* (2019.01)

(52) U.S. Cl.
CPC .......... *G06F 16/954* (2019.01); *G06F 16/951* (2019.01)

(58) Field of Classification Search
CPC ............................ G06F 16/951; G06F 16/954
See application file for complete search history.

(56) References Cited

U.S. PATENT DOCUMENTS 8,521,734 B2 8/2013 Walther et al.
8,756,224 B2 * 6/2014 Dassa .................. G06F 16/972 707/723
9,129,227 B1 * 9/2015 Yee ........................ G06N 3/047
9,135,344 B2 * 9/2015 Mason ............... G06F 16/9538
(Continued)

FOREIGN PATENT DOCUMENTS

WO 2023282854 4/2023

OTHER PUBLICATIONS

Xuning Tang and Christopher C. Yang, Drexel University, “Ranking User Influence in Healthcare Social Media,” ACM Transactions, 2012, pp. 73:1-73:21. (Year 2012).*
(Continued)

*Primary Examiner* — Cheryl Lewis

(57) ABSTRACT

The present technology has the ability to establish connections between content that do not have direct or explicit relationships. Implicit influence relationships can be established from user download sequence data, campaign data with keyword targeting, and content review data that mentions other content. Using these influence relationships, the relevance of content items can be determined based on the influence relationship of linked content items and a similarity relationship of content items. However, the importance of the influence relationship in ranking content items can vary depending on the parameters against which the content item is considered relevant. To address this, the present technology includes a context-driven factor that is used as a weight to adjust the impact of the influence relationship of the ranking, depending on the parameters against which the content item is considered relevant.

21 Claims, 13 Drawing Sheets

(56) References Cited

U.S. PATENT DOCUMENTS 9,195,748 B2 * 11/2015 Angulo ............... G06F 16/9566
10,210,558 B2 2/2019 Akolkar et al.
10,628,432 B2 4/2020 Guo et al.
10,635,725 B2 * 4/2020 Samdani ................. H04L 67/02
10,762,092 B2 9/2020 Chakravarti et al.
10,902,064 B2 1/2021 Spears et al.
11,017,003 B2 5/2021 Epstein
11,113,291 B2 9/2021 Gotmanov
11,210,301 B2 12/2021 de Almeida Forjaz de Lacerda et al.
11,630,861 B2 4/2023 Wang et al.
2008/0082528 A1 * 4/2008 Bonzi ................. G06F 16/9535 707/999.005
2008/0183695 A1 7/2008 Jadhav et al.
2009/0119173 A1 * 5/2009 Parsons .................. G06Q 30/02 705/1.1
2013/0318156 A1 * 11/2013 Friedman ............... G06Q 50/01 709/203
2014/0122456 A1 * 5/2014 Dies ...................... G06F 16/353 707/723
2014/0250115 A1 9/2014 Yang
2014/0344230 A1 * 11/2014 Krause ................ G06F 16/9024 707/723
2015/0026144 A1 * 1/2015 Wai ....................... G06F 16/248 707/706
2015/0120753 A1 * 4/2015 Wang .................. G06F 16/2228 707/746
2016/0117328 A1 * 4/2016 Mondal ............. G06F 16/24578 707/725
2016/0140447 A1 * 5/2016 Cohen .................... G06N 5/048 706/52
2016/0342692 A1 * 11/2016 Bennett ............... G06F 16/9535
2020/0034881 A1 * 1/2020 Zhou .................. G06Q 30/0275
2020/0327571 A1 * 10/2020 Beaver .................... G06F 40/35
2020/0401634 A1 * 12/2020 Duan .................... G06F 16/958
2022/0114205 A1 * 4/2022 Rodrigues ........... G06F 16/9024
2022/0284327 A1 9/2022 Zhang et al.
2022/0358559 A1 11/2022 Liu et al.
2025/0258883 A1 8/2025 Goodman Gu et al.

OTHER PUBLICATIONS

Extended European Search Report issued in corresponding EP application No. 24155945.9, mailed Jun. 20, 2024 (8 pages).

Non-Final Office Action issued in U.S. Appl. No. 19/059,386, mailed Apr. 16, 2026, 15 pages.

* cited by examiner

Search Keyword

Short Video Player

Top-N Search Keyword Related Apps

Tiktok
Shorts for Youtube
Podcast Video Maker
DripDrop
Atoplay

Specialization Vector for PageRank $$\vec{E} = \begin{bmatrix} \cdots \\ 0 \\ 1 \\ 1 \\ 0 \\ 0 \\ 1 \\ \cdots \end{bmatrix} / N$$

FIG. 4

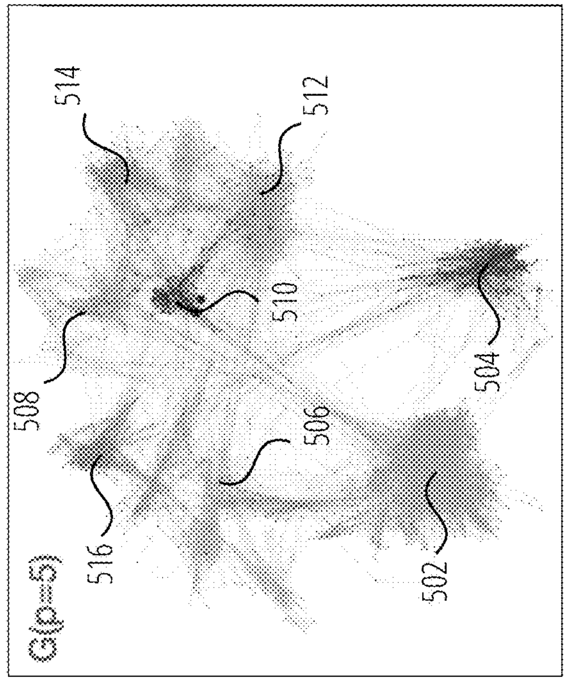
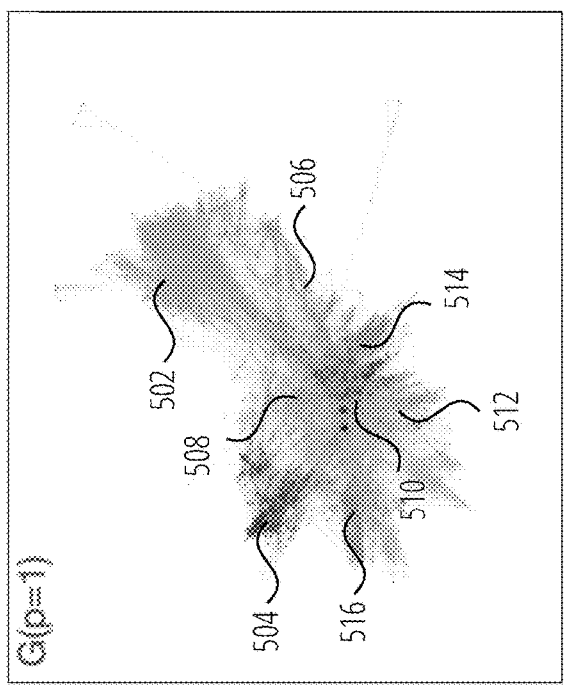
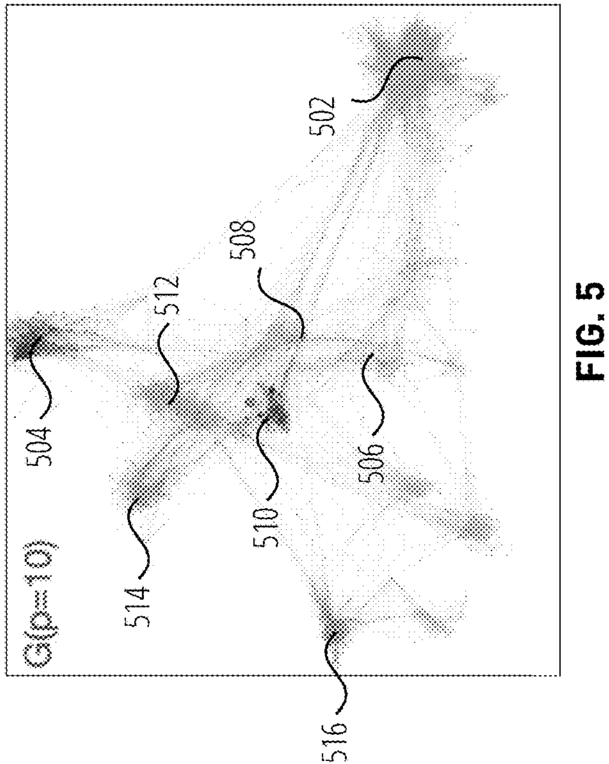
FIG. 5

QUERY KEYWORD: INSTGRAM ($P^C = 1, N = 20$)

| | primaryappname | primarygenrestring |
|---|---|---|
| 0 | Instagram | Photo & Video |
| 1 | Snapchat | Photo & Video |
| 2 | Facebook | Social Networking |
| 3 | Messenger | Social Networking |
| 4 | Repost+ for Instagram . | Social Networking |
| 5 | TikTok | Entertainment |

QUERY KEYWORD: BIOLOGY ($P^C = 10, N = 20$)

| | primaryappname | primarygenrestring |
|---|---|---|
| 0 | StudyWise Microbiology | Education |
| 1 | Microbiology Quiz | Education |
| 2 | Microbiology and Infectious Diseases | Medical |
| 3 | Microbiology Virtual Patients | Medical |
| 4 | Case Files Microbiology, 3e | Medical |
| 5 | Microbiology Dictionary | Education |

QUERY KEYWORD: HEALTH ($P^C = 5, N = 20$)

| | primaryappname | primarygenrestring |
|---|---|---|
| 0 | MyFitnessPal: Calorie Counter | Health & Fitness |
| 1 | Lifesum: Healthy Eating | Health & Fitness |
| 2 | Zero: Fasting & Health Tracker | Health & Fitness |
| 3 | Noom: Healthy Weight Loss | Health & Fitness |
| 4 | Sydney Health | Medical |
| 5 | Lose Weight at Home in 30 Days | Health & Fitness |

FIG. 6

Keyword = Biology

| G(p=10) | | G(p=1) | |
|---|---|---|---|
| | **Primary App Name** | | **Primary App Name** |
| 0 | StudyWise Microbiology | 0 | Microbiology and Infectious Dis |
| 1 | Microbiology Quiz | 1 | StudyWise Microbiology |
| 2 | Microbiology and Infectious Dis | 2 | Microbiology Quiz |
| 3 | Microbiology Virtual Patients | 3 | Snapchat |
| 4 | Case Files Microbiology, 3e | 4 | Instagram |
| 5 | Microbiology Dictionary | 5 | USMLE Microbiology Flashcards |
| 6 | Quizlet: Learn with Flashcards | 6 | Microbiology Virtual Patients |
| 7 | Socratic by Google | 7 | Microbiology Dictionary |
| 8 | USMLE Microbiology Flashcards | 8 | Facebook |
| 9 | Microbiology Quiz Mcqs | 9 | Microbiology Quiz Mcqs |
| 10 | Khmer Biology | 10 | Messenger |
| 11 | Explain the word biology | 11 | Photomath |
| 12 | Microbiology Pronunciations Lit | 12 | Socratic by Google |
| 13 | Medical Microbiology Quiz | 13 | Microbiology Pronunciations Lit |
| 14 | Microbiology by Dr Sonu Panwar | 14 | Medical Dictionary by Farlex |
| 15 | Microbiology Quizzes | 15 | Microbiology by Dr Sonu Panwar |
| 16 | Biolab - your personal biology | 16 | Complete Anatomy '22 |
| 17 | Biologist Riddles - fascinating | 17 | NCLEX RN Nursing \| My Mastery |
| 18 | Microbiology Lite | 18 | Case Files Microbiology, 3e |
| 19 | Microbiology X: College and AP | 19 | Mathway: Math Problem Solver |
| 20 | Microbiology Labs | 20 | Microbiology Labs |
| 21 | Microbiology Pronunciations | 21 | Microbiology Quizzes |
| 22 | Astrobiology: A VR Experience | 22 | Medical Microbiology Quiz |
| 23 | MedMicrobes | 23 | Explain the word biology |
| 24 | Medical Dictionary by Farlex | 24 | Biolab - your personal biology |
| 25 | Tumblr – Fandom, Art, Chaos | 25 | Biologist Riddles - fascinating |
| 26 | Lifeliqe | 26 | Microbiology Pronunciations |
| 27 | Icon Skins ™ | 27 | Microbiology X: College and AP |
| 28 | Psychiatry Exam Questions | 28 | Microbiology Lite |

FIG. 7

Keyword = FACEBOOK

| G(p=1) | | G(p=10) | |
|---|---|---|---|
| | **Primary App Name** | | **Primary App Name** |
| 0 | Instagram | 0 | Instagram |
| 1 | Snapchat | 1 | Snapchat |
| 2 | Facebook | 2 | YOYO: Meet new friends be real. |
| 3 | Messenger | 3 | Coco —Live Stream & Video Chat |
| 4 | TikTok | 4 | MyPad for Facebook & Instagram |
| 5 | WhatsApp Messenger | 5 | Timeline Cover Photo Maker Free — Desi |
| 6 | YouTube: Watch, Listen, Stream | 6 | Cover Photo Maker for Facebook |
| 7 | Twitter | 7 | xView: Reports for Facebook FB |
| 8 | Cover Photo Maker for Facebook | 8 | Video Player for Facebook |
| 9 | Timeline Cover Photo Maker Free | 9 | Stickers Free —Gif Photo for WhatsApp, |
| 10 | Meta Business Suite | 10 | Emoji Keyboard & Emoticons — Animated |
| 11 | Tinder — Dating New People | 11 | Facebook |
| 12 | Creator Studio from | 12 | Puffin for Facebook |
| 13 | Facebook Analytics | 13 | Facely HD for Facebook + Social Apps |
| 14 | MyPad for Facebook & Instagram | 14 | Emoji 3 FREE — Color Messages — New En |
| 15 | xView: Reports for Facebook FB | 15 | Big Emoji Keyboard — Stickers for Mess |
| 16 | Facebook Local | 16 | Facebook Creator |
| 17 | Facebook Creator | 17 | Creator Studio from Facebook |
| 18 | Facebook Portal | 18 | Facebook Portal |
| 19 | Facebook Groups | 19 | Lite For Facebook & Twitter |
| 20 | Video Player for Facebook | 20 | Facebook Local |
| 21 | Emoji 3 FREE — Color Messages — New E | 21 | Facebook Groups |
| 22 | Emoji Keyboard & Emoticons — Animated | 22 | Facebook Analytics |
| 23 | Stickers Free —Gif Photo for WhatsApp | 23 | Facebook Gaming |
| 24 | Facebook Gaming | 24 | BamBam: Live Random Video Chat |
| 25 | Big Emoji Keyboard - Stickers for Mes | 25 | Anonymous Live Video Chat —VJOY |
| 26 | Puffin for Facebook | 26 | Tinder — Dating New People |
| 27 | Facely HD for Facebook + Social Apps | 27 | Gaze — Video Chat |
| 28 | Lite For Facebook & Twitter | 28 | Chatous: 18+ Live Video Chat |

FIG. 8 providing a user interface to configure a targeted campaign, wherein a first item of invitational content that is configured to invite engagement with a first content item is to be targeted to be presented in association with at least one second content item 1202 identifying a plurality of result content items matching at least one criterion, the plurality of result content items identified from content items in a collection of content items 1204 ranking the result content items in the plurality of result content items based on a similarity relationship between content items in the plurality of result content items, and an influence relationship between content items in the plurality of result content items 1206 recommending one or more highly ranked content items to be selected as the at least one second content item, wherein the at least one criterion is relevance to the first content item 1208 receiving a selection of the one or more highly ranked content items in the user interface 1210 configuring the targeted campaign to serve the first item of invitational content in association with the selected one or more highly ranked content items 1212

FIG. 12

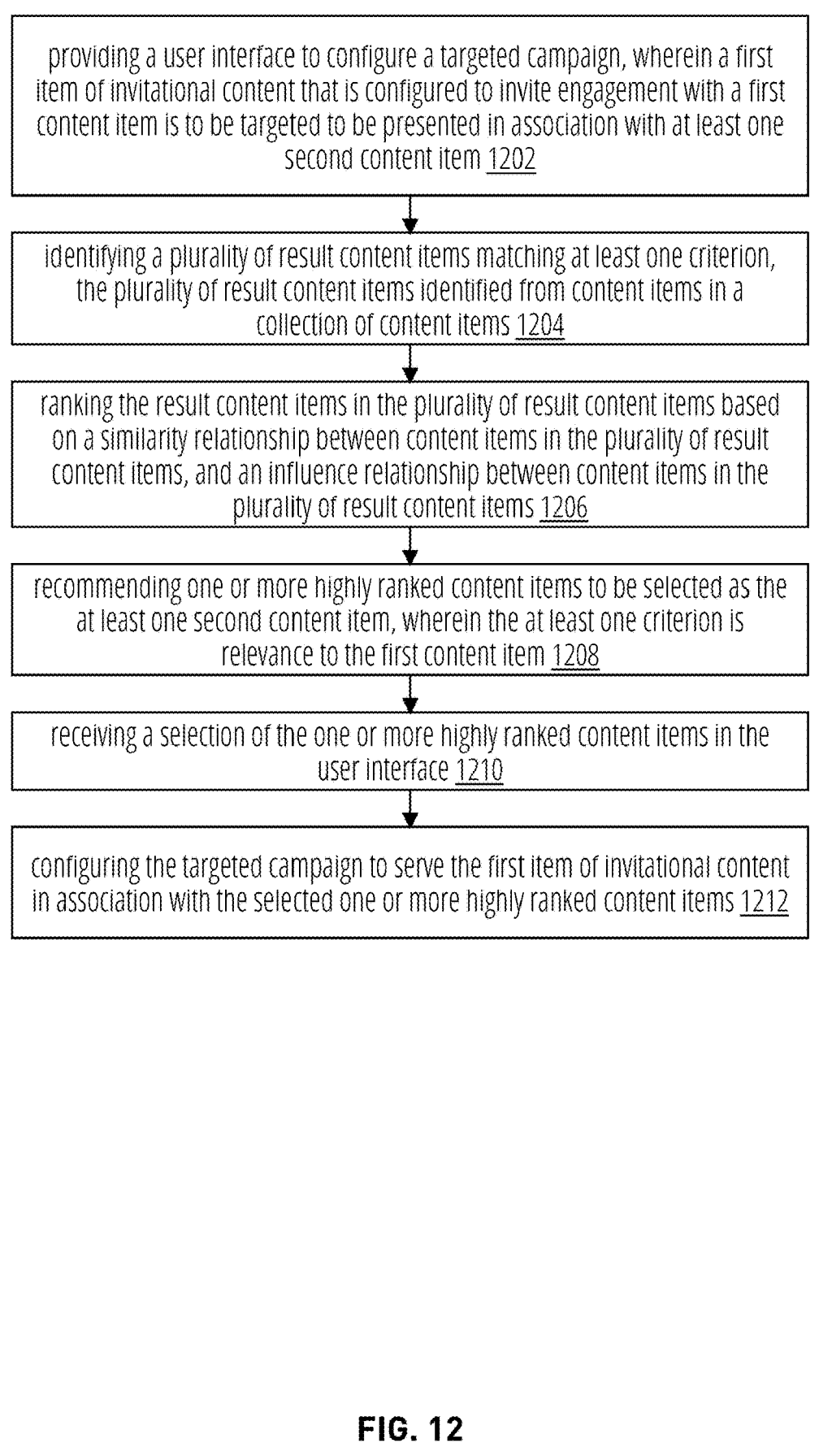

RANKING OF CONTENT BASED ON IMPLIED RELATIONSHIPS

CROSS-REFERENCE TO RELATED APPLICATIONS

This application priority to U.S. provisional application No. 63/486,011, filed on Feb. 20, 2023, which is expressly incorporated by reference herein in its entirety.

BACKGROUND

Ranking of computer-retrieved search results provides a more relevant user experience. Indeed, the Internet would be very hard to navigate if search results returned by Internet search engines indiscriminately returned search results. The specific methodology by which Internet search engines rank search results is complex. However, in general, the methodology relies on both a factor for determining the relevance of the content of a search result and a factor derived from the link structure of the web that can be factored into the search result, among others. This latter factor is based on an assumption that web pages that are referenced by other pages a lot, and referenced by important other pages are more relevant.

BRIEF DESCRIPTION OF THE SEVERAL VIEWS OF THE DRAWINGS

The present technology will be described with reference to the appended drawings. The drawings aid in the description of the present technology and are not to be considered to be limiting the scope of the appended claims. The accompanying drawings include:

FIG. 4 illustrates an example beginning with receiving a search input and leading to the generation of a vector that can be used to search an embedding space to identify similar content items in accordance with some aspects of the present technology.

FIG. 5 illustrates the effect of the context-driven factor, p, on the graph of content items. Each tile illustrates a distance between App titles in a graph with a p=1, a p=5, and a p=10 in accordance with some aspects of the present technology.

FIG. 6 illustrates a listing of search results when the context-driven factor, p, is p=1, p=5, and p=10 in accordance with some aspects of the present technology.

FIG. 7 illustrates the impact of the context-driven factor, p on search results relevant to an example keyword, "biology" in accordance with some aspects of the present technology.

FIG. 8 illustrates the impact of the context-driven factor. p on search results relevant to the keyword, "FACEBOOK" in accordance with some aspects of the present technology.

FIG. 12 illustrates an example routine for configuring a targeted invitational content campaign in accordance with some aspects of the present technology.

DETAILED DESCRIPTION

Figure 1:
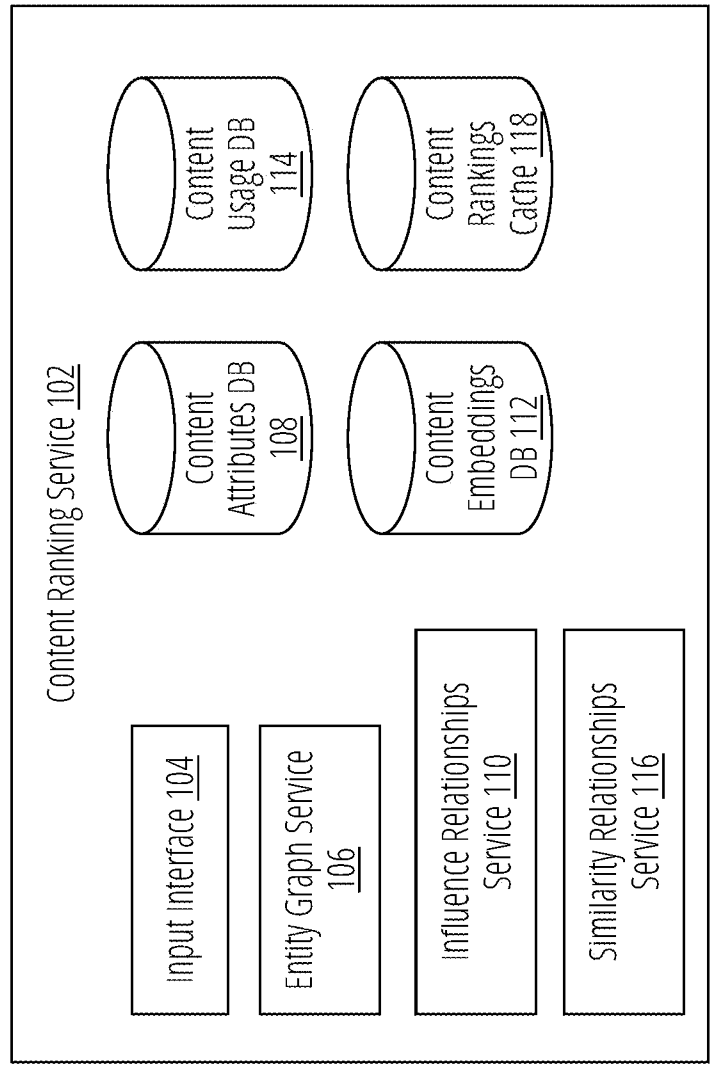
FIG. 1 illustrates an example content ranking engine in accordance with some aspects of the present technology.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure.

While Internet content includes intrinsic links such that an Internet search engine can create a graph of websites as nodes connecting to the websites to which those websites link, many other types of content lack any designation of a relationship to other content items. Therefore, most ranked results of content lacking intrinsic relationships to other content items are generally ranked based on similarity relationships.

For example, content such as Apps, music, books, videos, advertisements, etc. are generally ranked based on metadata associated with the content items. For example, this type of content is ranked based on titles, authors, genres, or tags meant to associate the content with specific criteria. In some instances the content ranking can also be influenced by quality indicators such as user reviews/ratings, number of downloads, and sometimes sponsorship of a content item to cause it to be featured in search results.

One problem with ranking content purely based on similarity relationships and quality indicators is that the search results are unintentionally weighted towards older content that has had more time to develop reviews and to be heavily downloaded, and the search results are biased against newer content or more relevant content.

The present technology addresses this problem by deriving relationships between content that typically does not have direct or explicit cross-references between the content. For example, implicit influence relationships can be derived from aggregated user download sequence data (the order and period in which content is downloaded), campaign data with keyword targets between content (content publishers can indicate that their content is relevant to specified keyword targets that can reference other content), and/or content review data that mentions other content.

From these derived influence relationships, a graph can be created that reflects the strength of these derived relationships between content. The strength of these derived relationships can be indicated by edge values or weights in the graph that connect two content items. The edge values measure the influence relationship of linked content items and imply that content is influential if the content is referred by other highly influential content, and if the content bridges discoveries of other content. The edge values that express the strength of the influence relationship of one content item on another content item can then be utilized to determine content item ranks.

However, in some embodiments, the importance of the influence relationship in ranking content items can vary depending on the parameters against which the content item is considered relevant. Accordingly, the present technology further includes a context-driven factor that is used as a weight to vary the impact of the influence relationship of the ranking depending on the parameters against which the content item is considered relevant. The context-driven factor gives the graph a dynamic nature, allows it to better handle scale, and renders more relevant ranking results for a user intent.

In some embodiments, a self-consistent graph can be calculated that determines a context-driven factor and weights edges of a graph based on the relationships between nodes in the graph. The self-consistent graph might lack some precision based on the context derived from a search, but it mostly captures the relationships between similarity relationship and contextual data, and it has the benefit of being pre-computed offline which results in more efficient uses at query time. Since relationships between nodes in the graph can change frequently, the self-consistent graph may need to be recomputed periodically.

For example, when ranking search results for Apps in an App Store based on a user-provided keyword the importance of the influence relationship can vary depending on the user-provided keyword. If, for example, the keyword was "INSTAGRAM," the influence relationship between apps connected to the App INSTAGRAM would be important in ranking search results, whereas, if the keyword was "biology", the influence relationship between apps in the search results is comparatively less important than in the search result from the search on the keyword "INSTAGRAM" because of the fact that the search results for the keyword "biology" are all similar to the topic domain.

Stated more formally, the present technology generates a set of graphs, G(p), with a numerical context-driven factor, p ($1<p<\infty$). Where graph G is adaptively constructed based on the context-driven factor p. Smaller values of p construct a graph to emphasize influence relationship-based ranking results, and larger values of p construct a graph to focus on similarity relationship-based ranking results. Further, the context-driven factor p is attached to the search/query/intention/activity session as an index and helps generate high-quality ranking scores via the contextualized content rank algorithm of the present technology through G(p) accordingly.

The present disclosure contemplates that the present technology can be used with any relevance ranking methodology to improve rankings of content items.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculate control of the delivered content. Further, other uses for personal information data that benefit the user are also contemplated by the present disclosure. For instance, data can be used to improve search results.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example content ranking service 102. The content ranking service 102 is configured to evaluate both explicit and implicit attributes of content items to determine whether one content item is similar to another content item, and to determine whether one content item might influence a user to download or interact with another content item.

In some embodiments, the content ranking service 102 can be used to generate rankings of content items based on input criteria. In some examples, the rankings of content items can be with respect to relevance to input criteria. The search input is received through an input interface 104 which could be a search bar that is configured to receive keywords or the input interface 104 could be an application programming interface (API) configured to receive criteria from another service. For example, the search input could be keywords received in an App Store user interface. In another example, an advertisement server could provide criteria through an API from which an advertisement should be selected. In another example, a content management system could utilize the content ranking service 102 for ranking content items based on criteria provided by the content management system.

The content ranking service 102 can generate the rankings of content items by utilizing a graph of relationships between content items. The entity graph service 106 can be used to create the graph of the relationships between content items where the relationships are defined by a similarity relationship component and an influence relationship component.

The influence relationships service 110 can derive implied influence relationships between content items through an analysis of data stored in the content usage database 114. Content usage database 114 can include data aggregated across a population of users indicating when content items were downloaded, and/or when content items were used. As will be addressed herein, the sequences in which content items were downloaded or used can imply an influence by one content item on a user to download or interact with another content item.

The similarity relationships service 116 can determine which content items are similar to each other. In some embodiments, the similarity relationships service 116 can utilize data in the content attributes database 108 to create embeddings representing each content item and to locate the embeddings into an embedding space. In some embodiments, the similarity relationships service 116 can utilize machine learning techniques to learn how to represent the content items as embeddings and can utilize other machine learning techniques to locate content item embeddings in the embedding space, wherein the closer an embedding of one content item is to an embedding of another content item the more similar the content items are considered to each other. The content item embeddings can be stored in the content embeddings database 112. Alternatively, the similarity relationships service 116 can utilize a trained machine learning algorithm to output content items that are similar to another content item or that are similar to the input keywords. The similarity relationships service 116 can utilize the content embeddings to inform the entity graph service 106 about the similarity of a content item to another content item and/or to the search criteria as addressed in more detail with respect to FIG. 4.

In some embodiments, the content ranking service 102 can include a content rankings cache 118. The content rankings cache 118 can store content ranking scores for content items with respect to a search input. As described herein, content ranking scores vary with the context of the search input. Accordingly, different content ranking scores can be stored based on previously determined content ranking scores resulting from previously received search inputs. In some embodiments, previously determined content ranking scores are stored temporarily (e.g., for 1-hr, 12-hr, 1-day, 1-week, 1-month, etc.) to account for new content items and changing characteristics of content items.

Figure 2:
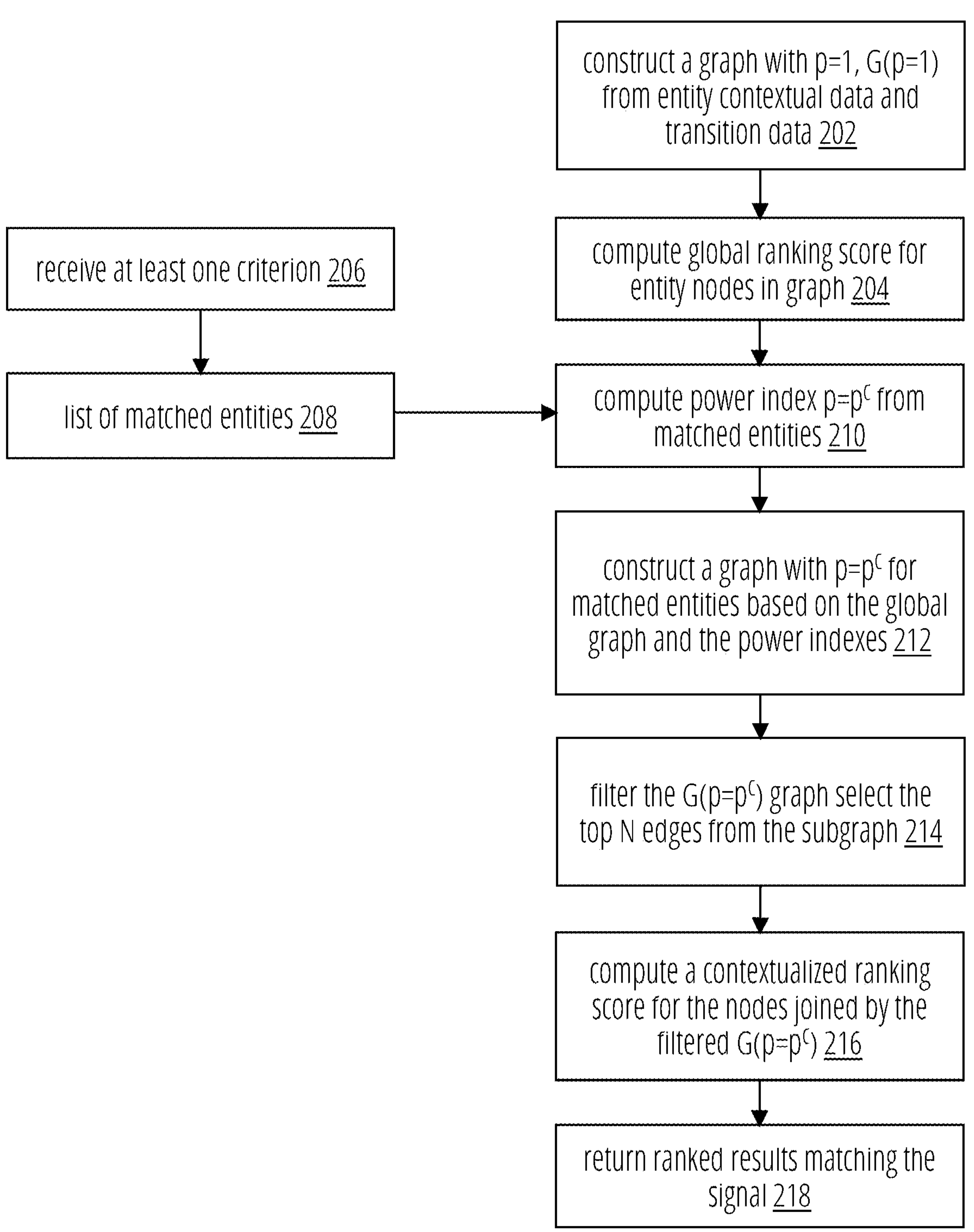
FIG. 2 illustrates an example routine for ranking content items based on similarity relationships and influence relationships, where the weight given to the similarity relationships and influence relationships is dependent on the context of the search terms, the cross-references between items, and potential relevant search results in accordance with some aspects of the present technology.

FIG. 2 illustrates an example routine for ranking content items based on similarity relationships and influence relationships, where the weight given to the similarity relationships and influence relationships is dependent on the context of the search terms and potential relevant search results. In FIG. 2 a portion of a graph is dynamically adjusted to calculate a relationship between two or more content items based on a context-driven factor. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes constructing a global graph of content item entities having influence relationships amongst each other from entity contextual data and transition data at block 202. For example, the entity graph service 106 can determine relationships between content items. In some examples, the content can be Apps in an App store, media items (textual, audio, video, etc.), or advertisements, etc. In some embodiments, the content can even include heterogenous content items (i.e., the content items can be different types of content items).

In some examples, the present technology can determine the influence relationships between content items based on contextual data and transition data.

The contextual data can include data provided with respect to the content that suggests a relationship to another content item. In some embodiments, contextual data can be derived from content attributes database 108 (title, description, review, rating . . . etc.) or from an advertising service. Some examples of contextual data can include key words that are associated with the content item that indicate what search parameters might be relevant to the content item. For example, if an App developer suggests App X should be advertised when a user searches for App Y, App X can be contextually associated with App Y. Another example of contextual data is data provided by a user of the content item that references another content item, e.g., in a review that references another content item. Note that contextual data is not necessarily suggestive of similarity between two items of content, though some of the data might suggest that two content items are similar.

The transition data can include data about content item usage and can be derived from the content usage database 114. In some embodiments, transition data can be derived from a sequence of downloads of content items within a period. For example, when the content is Apps, transition data can reflect that a first App was downloaded then 10 minutes later a second App was downloaded. If it is observed across aggregated user data that the first App is often downloaded and then the second App is downloaded within a short enough period to be relevant, this can imply that the first App has some influence relationship that can lead to the users downloading the second App. In some embodiments, the longer the period that passes between the download of the first App and the second App, the less of an influence relationship that exists. In some aspects, a period longer than 30 minutes, 1 hr., or 1 day might indicate that no influence relationship exists and that any pattern is the result of other factors.

Another example of transition data can be usage transitions wherein a user can use a first content item and then switch to a second content item within a relevant period.

A graph can be constructed from the contextual data and the transition data to build linkages between content items. The linkages between content items can be expressed in a mathematical expression to build the graph G to represent the linkage between entities (content items), via directed-weighted edges G(p)←w(A→B, p):

$$w(A \to B, p) \equiv esw(A, B)^p \cdot etw(A \to B)^{1/p}$$

where esw(A, B) is the entity similarity weight between entity A and entity B, and etw(A→B) is the entity transition weight which implicitly indicates how likely the user transition from entity A to B. p is a tunable hyperparameter, and it adjusts the power of entity similarity weight and entity transition weight under different contexts.

The entity similarity weight is calculated via cosine-similarity (or similar methods) between the embeddings of two entities A and B:

$$esw(A, B) = \frac{F(A) \cdot F(B)}{\|F(A)\| \cdot \|F(B)\|}$$

where F is the embedding function. Embeddings of entities can be trained from a dataset of the contextual data using various embedding techniques.

The entity transition weight, etw(A→B), is defined as follows:

$$etw(A \to B) = \sum_{user} \sum_{A,B \in user\ activity} DecayFunction(t(B) - t(A), \lambda)$$

where, is the n-th entity retrieval sequence t(A) denotes the timestamp when the user retrieved entity A t(B) denotes the timestamp when the user retrieved entity B λ is a constant decay factor Note that, in principle, A and B could be the user activities at any time, however, we consider consecutive activities of A followed by B.

The DecayFunction has various choices, for example, $$DecayFunction \equiv StepFunction(x - \lambda)$$

$$DecayFunction \equiv \exp(-x/\lambda)$$

$$DecayFunction \equiv \exp(-x^2/\lambda^2)$$

As noted above, p is a tunable hyperparameter, and it adjusts the power of entity similarity weight and entity transition weight under different contexts. The need to account for the different contexts is because not all of the contextual signals are equally weighted. For example, in the APPLE App store, "INSTAGRAM" could be one of the most popular search keywords and there are many other Apps directly or indirectly associated with "INSTAGRAM". In this case, it is natural to construct an influence relationship-oriented graph for the recommendation. On the other hand, in the Apple App store, "Biology" could be a rare and unpopular search keyword and a minority group of users search for it. Therefore, the user's intention could strongly be leaning toward looking for similarity relationship-oriented Biology Apps. Accordingly, p can be used to weight the contribution of the influence relationship and similarity relationship when determining the value of an edge between two entities in a graph based on the context of at least one search criterion.

Therefore, according to some examples, the method includes receiving at least one criterion at block 206.

In order to compute the context-driven factor p, we first need to construct the graph, and for the creation of the initial graph we can designate, p=1:

$$G(p = 1) \leftarrow w(A \to B, p = 1)$$

With the initial graph constructed, according to some examples, the method includes computing a global ranking score for entity nodes in the graph at block 204. Using the graph, G(p=1), the entity graph service 106 can compute the global ranking score (GRS) using a Page Rank algorithm. An example page rank algorithm can be:

$$GRS(p_i) = \frac{(d)}{N} + (1-d)\sum_{l_{j,i}\in E}\frac{PR(p_j)}{Outdegree(p_j)}$$

PR: PageRank score
D: damping factor, about 0.15
N: # of matching nodes in the graph
E: set of edges for a given node The global ranking score can be thought of as a generic mechanism to determine a score of relevance to input search terms. As will be addressed below, the value of using this generic mechanism is to get a measure of the context implied by the at least one search criterion from the generic search results. Even though the generic mechanism fails to return search results that are as useful as the present technology, it is a sufficient mechanism to determine the context-driven factor as addressed below.

The entity graph service 106 can normalize the global ranking score (nGRS) to the range of [0,1] by dividing the max value:

$$nGRS = GRS/\max(GRS)$$

According to some examples, the method includes constructing an initialization list of entities matching the search parameters at block 208. For example, the entity graph service 106 can construct an initialization list given by the context-matched entities as illustrated and further addressed with respect to FIG. 4. The initialization list can be used to retrieve the nGRS from the initialization list. In other words, a filtered list of entities that includes the context-matched entities is derived and a list of their nGRS is created. This list is the filtered-nGRS expressed below.

According to some examples, the method includes computing the value of the context-driven factor from matched entities at block 210. For example, the entity graph service 106 can compute the context-driven factor, p, for the context:

$$p^c = 1 - \log_a(\max(\text{filtered } nGRS)),$$

where the log base a is an empirical parameter that can be tuned for recommendation optimization. E.g. a can be 2, e, 10, or any positive real number. The superscript c of $p^c$ denotes "context" for the parameter, p.

Having now derived the context-driven factor, p, that is dependent on the search parameters, and more specifically that is dependent on a generic method of determining relevance to a search term or phrase, the method turns to determining search results for the query that takes into account aspects of contextual data and transition data.

According to some examples, the method includes constructing a power-graph with power=$p^c$ of matched entities based on the power-graph with power=1 and the context-driven factor at block 212.

For a given intent signal (such as implied by the search term the user entered or the product context), we can revise the global graph to conduct a subgraph using the context-driven factor derived as addressed above.

For example, the entity graph service 106 can construct a power-graph, G(p=$p^c$).

According to some examples, the method includes filtering the power-graph to select the top vertices from the subgraph at block 214. For example, the entity graph service 106 can trim the graph by selecting the top-N outgoing edges for each node, $$G(p^c, N) \leftarrow w(A \to B, p^c, N).$$

According to some examples, the method includes computing a contextualized ranking score for the nodes joined by the filtered top vertices at block 216. For example, the entity graph service 106 can use the contextualized Page Rank to calculate the contextualized ranking score based on G($p^c$,N) and the same initialization list addressed above.

The formula for calculating contextualized PageRank X is as below:

$$\vec{X}(t+1) = d\vec{E} + (1-d)A\vec{X}(t)$$

where t is the iteration number of PageRank, A is the adjacency matrix, $$A = \begin{bmatrix} w(1\to 1, p^c, N) & \dots & w(1\to n, p^c, N) \\ \dots & \dots & \dots \\ w(m\to 1, p^c, N) & \dots & w(m\to n, p^c, N) \end{bmatrix}$$

representation of weighed directed edges constructed as addressed above, N is the number of nodes and d is a damping factor. The contextualized ranking score can then be used for entity recommendation and other downstream services.

According to some examples, the method includes returning ranked results matching the signal at block 218. For example, the entity graph service 106 can return ranked results matching the search keyword(s).

Figure 3:
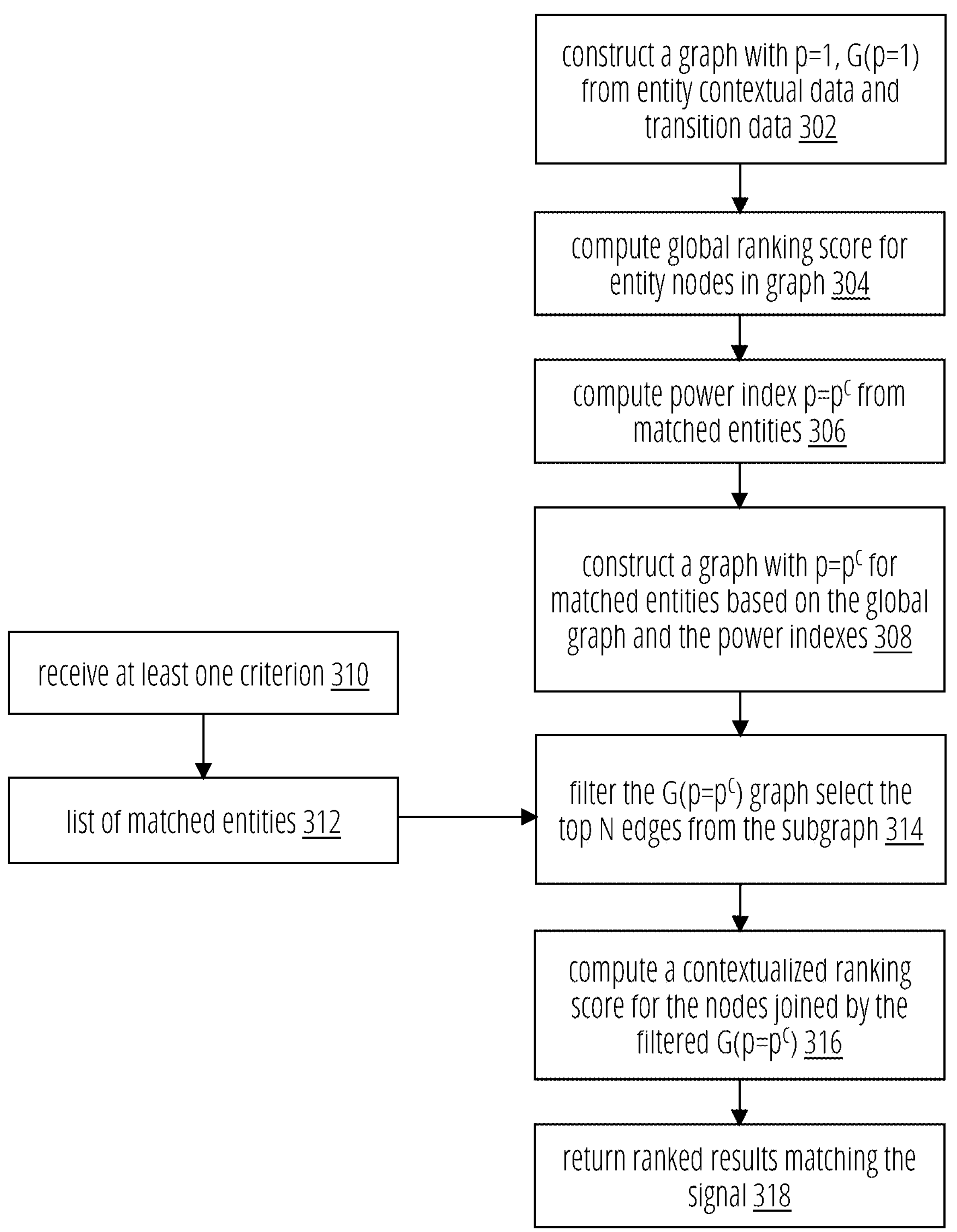
FIG. 3 illustrates an example routine for ranking content items based on similarity relationships and influence relationships, where the weight given to the similarity relationships and influence relationships is dependent on the context of the search terms, the cross-references between items, and potential relevant search results in accordance with some aspects of the present technology.

FIG. 3 illustrates an example routine for generating a graph where the edge weights in the graph are based on similarity relationships and influence relationships for a given vertex. The weight given to the similarity relationships and influence relationships is dependent on the context of the at content item represented by the vertex of the graph. In FIG. 3 a self-consistent graph is pre-calculated before receiving a search input, and the graph is used to answer the search query or other task. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes constructing a global graph of content item entities having influence relationships amongst each other from entity contextual data and transition data at block 302. As will be described herein, the edges of the graph are calculated from a tunable parameter p that relates the importance of the influence relationships and contextual data of items represented by vertices in the graph that are linked by that edge. In this initial step, p can be set to 1, for the purposes of creating the graph. When p=1, the graph is arranged based on contextual data, while ignoring the influence relationships. Later the graph will be revised with a calculated p that more accurately reflects the relationship between two vertices.

Although there is some similarity between block 302 and block 202, the specific routine used to construct the graph includes some differences such as the user of an entity local transition weight. A graph can be constructed from the contextual data and the transition data to build linkages between content items. The linkages between content items can be expressed in a mathematical expression to build the graph G to represent the linkage between entities (content items), via directed-weighted edges $G(\{p_A\})+w(A \rightarrow B, p_A)$:

$$w(A \rightarrow B; p_A) \equiv esw(A, B)^{p_A} \cdot eltw(A \rightarrow B)^{1/p_A}$$

where esw(A, B) is the entity similarity weight between entity A and entity B, and eltw(A→B) is the entity local transition weight which implicitly indicates how likely the user transition from entity A to B from the local perspective. p is a tunable hyperparameter, and it adjusts the power of entity similarity weight and entity transition weight under different contexts. $\{p_A\}$ is a set of power-index over each node of the graph. The set of power-index can be computed through the global PageRank scores, $p_A=1-\log_a(\tilde{x}_A)$, with $\tilde{x}_A=x_A/\max\{x_A\}$, where the global PageRank scores can be carried out with the iteration method, $$\vec{X}(t+1) = dI + (1-d)A(\{P_A\})\vec{X}(t)$$

$A(\{p_A\})$ is the adjacency matrix constructed from $G(\{p_A\})$, $\hat{X}=[x_1, \ldots, \ldots, X_A, \ldots, X_n]^T$ is the Global PageRank scores vector with element, $x_A$. The above definition for $p_A$ established a circular-dependency with the Global PageRank $x_A$. Therefore, we need compute the pa values self-consistently with a convergence criterion. To kick start the self-consistent computation loop, we assign initial value, 1, to all $p_A(n=1)$. The loop ends when the difference of pa between two steps is smaller than the threshold, $\max\{p_A(N=1)-p_A(n)<\in\}$. Note that, t, denotes the iteration step for the Global PageRank and, n, denotes the iteration step for the $p_A$.

The entity similarity weight is calculated via cosine-similarity (or similar methods) between the embeddings of two entities A and B:

$$esw(A, B) = \frac{F(A) \cdot F(B)}{\|F(A)\| \cdot \|F(B)\|}$$

where F is the embedding function. Embeddings of entities can be trained from a dataset of the contextual data using various embedding techniques.

The entity local transition weight, eltw(A→B), is defined as follows:

Entity local transition weight (eltw) simulates how likely the user transition from node-A to node-B from a node perspective. The entity local transition weight is defined based on the entity transition weight (etw):

$$eltw(A \rightarrow B) \equiv \frac{etw(A \rightarrow B)}{\max\{etw\ A \rightarrow B);\ \text{of node}\ A\}}$$

The entity transition weight, etw(A→B), is defined as follows:

$$etw(A \rightarrow B) = \sum_{user\ A,Beuser} \sum_{activity} \text{DecayFunction}(t(B) - t(A), \lambda)$$

where, n is the n-th entity retrieval sequence t(A) denotes the timestamp when the user retrieved entity A t(B) denotes the timestamp when the user retrieved entity B λ is a constant decay factor Note that, in principle, A and B could be the user activities at any time, however, in some embodiments, the method considers only consecutive activities of A followed by B.

The DecayFunction has various choices, for example, $$\text{DecayFunction} \equiv \text{StepFunction}(x - \lambda)$$

$$\text{DecayFunction} \equiv \exp(-x/\lambda)$$

$$\text{DecayFunction} \equiv \exp(-x^2/\lambda^2)$$

As noted above, p is a tunable hyperparameter, and it adjusts the power of entity similarity weight and entity transition weight under different contexts. The need to account for the different contexts is because not all of the contextual signals are equally weighted. For example, in the APPLE App store, "INSTAGRAM" could be one of the most popular search keywords and there are many other Apps directly or indirectly associated with "INSTAGRAM". In this case, it is natural to construct an influence relationship-oriented graph for the recommendation. On the other hand, in the APPLEApp store, "Biology" could be a rare and unpopular search keyword and a minority group of users search for it. Therefore, the user's intention could strongly be leaning toward looking for similarity relationship-oriented Biology Apps. Accordingly, p can be used to weight the contribution of the influence relationship and similarity relationship when determining the value of an edge between two entities in a graph based on the context of at least one search criterion.

Therefore, according to some examples, the method includes receiving at least one criterion at block 310

As indicated a block 302, In order to compute the context-driven factor p, we first need to construct the graph with homogenous power-index for the $0^{th}$ iteration, $G(\{p_A^{t=0}\})$, with weighted directed edges from dataset X and Y with power-index, $p_a^0=1$, $G(\{p_A^0\}=1)$ $$G(\{p_A^0\} = 1) \leftarrow w\{A \rightarrow B, p_A^0 = 1)$$

With the initial graph constructed, according to some examples, the method includes computing a global ranking score for entity nodes in the graph at block 304. Using the graph, $G(\{p_A^0\}=1)$, the entity graph service 106 can compute the global ranking score (GRS) using a Page Rank algorithm.

The global ranking score can be thought of as a generic mechanism to determine a score of relevance of a node in the graph to other nodes local to it in the graph.

The entity graph service 106 can normalize the global ranking score (nGRS) to the range of [0,1] by dividing the max value:

$$nGRS = GRS/\max(GRS)$$

According to some examples, the method includes constructing an initialization list of entities matching the search parameters at block 312. For example, the entity graph service 106 can construct an initialization list given by the context-matched entities as illustrated and further addressed with respect to FIG. 4

According to some examples, the method includes computing the value of the context-driven factor at block 306. Although there is some similarity between block 306 and block 206, the specific routine used to compute the context-driven factor includes some differences such as the need for self consistency amongst the context-driven factor among nodes in the graph and that search parameters are not part of the determination in block 1306. For example, the entity graph service 106 can compute the context-driven factor, p, for the context for the $1^{st}$ iteration:

$$p^c A^{t=1} = 1 - \log_a(\max(nGRS)),$$

where the log base a is an empirical parameter that can be tuned for recommend action optimization. E.g. a can be 2, e, 10, or any positive real number. The superscript c of $p^c$ denotes "context" for the parameter, p.

Check if $\max\{|p^t_A - p^{t+1}|\} < \in$, where $\in$ is a small number of choice for the convergence criterion. If above criterion does not match the global ranking score needs to be recomputed. If above criterion matched, the loop is ended and $\{p_A^t\}$ is saved to a local storage for future usage, such as to create a self consistent graph with edge calculated based on $\{p^c{}_A{}^t\}$ for a given vertex.

According to some examples, the method includes constructing a power-graph with power=$p^c{}_A{}^t$ for entities based on the power-graph with power=1 and the context-driven factor at block 308.

Having now derived the context-driven factors, p, at block 1306 and constructing the self-consistent graph using the context-driven factors at block 308, the self-consistent graph can be used to determine search results or answer other queries about the contextual data and similarity relationships between items represented as nodes in the self-consistent graph.

The routine illustrated in FIG. 3 illustrates a use case for using the self-consistent graph for responding to a search query. Therefore, according to some examples, the method includes receiving at least one criterion at block 310.

According to some examples, the method includes constructing an initialization list of entities matching the search parameters at block 312. For example, the entity graph service 106 can construct an initialization list given by the context-matched entities as illustrated and further addressed with respect to FIG. 4. The initialization list can be used to retrieve the nGRS from the initialization list. In other words, a filtered list of entities that includes the context-matched entities is derived and a list of their nGRS is created.

According to some examples, the method includes trimming the self-consistent graph to select the top vertices at block 314. For example, the entity graph service 106 can trim the graph by selecting the top-N outgoing edges for each node, $$G(p^c A, N) \leftarrow w(A \rightarrow B, p^c A, N).$$

According to some examples, the method includes computing a contextualized ranking score for the nodes joined by the filtered top vertices at block 316. For example, the entity graph service 106 can use the contextualized Page Rank to calculate the contextualized ranking score based on $G(p^c A,N)$ and the initialization list addressed above.

The formula for calculating contextualized PageRank X is as below:

$$\vec{X}(t+1) = d\vec{E} + (1-d)A\vec{X}(t)$$

where t is the iteration number of PageRank, A is the adjacency matrix, $$A = \begin{bmatrix} w(1 \rightarrow 1, p^c, N) & \ldots & w(1 \rightarrow n, p^c, N) \\ \ldots & \ldots & \ldots \\ w(m \rightarrow 1, p^c, N) & \ldots & w(m \rightarrow n, p^c, N) \end{bmatrix}$$

representation of weighed directed edges constructed as addressed above, N is the number of nodes and d is a damping factor. The contextualized ranking score can then be used for entity recommendation, returning search results, and other downstream services.

According to some examples, the method includes returning ranked results matching the signal at block 318. For example, the entity graph service 106 can return ranked results matching the search keyword(s).

FIG. 4 illustrates an example beginning with receiving a search input and leading to the generation of a vector that can be used to search an embedding space to identify similar content items. In some embodiments, the example illustrated in FIG. 4 can be used to generate the initialization list addressed with respect to FIG. 2.

As illustrated in FIG. 4, the content ranking service 102 can receive an input through the input interface 104. In the example shown in FIG. 4, the input is an input keyword phrase "short video player." The content ranking service 102 can determine the top Apps related to the keyword phrase and the similarity relationships service 116 can use these Apps to generate a specialization vector that can be used to query an embedding space to find other applications that might be similar (or a trained machined learning algorithm can use the input to identify a representative embedding and identify other applications that might be similar).

For example, the similarity relationships service 116 can use the specialization vector to query the embedding space stored in content embeddings database 112, and the content ranking service can identify any content items that are considered close enough to the specialization vector to be considered similar. In some embodiments, the content ranking service 102 can also determine how similar a particular content item is to the specialization vector, whereby content items that are located closer to the specialization vector in the embedding space are deemed more similar to the specialization vector, and content items that are located further from the specialization vector in the embedding space are deemed less similar to the specialization vector. The content items that are considered close enough to the specialization vector to be considered similar can be utilized as the initialization list addressed with respect to FIG. 2.

FIG. 5 illustrates the effect of the context-driven factor, p, on the graph of content items. Each tile illustrates App titles in a graph with a p=1, a p=5, and a p=10. Each graph includes Apps in various categories. The most prominent categories that are represented in the graphs illustrated in FIG. 5 include games 502, health & fitness 504, education 506, entertainment 508, social networking 510, utilities 512, photo & video 514, and shopping 516.

In the graph p=10, the apps are grouped into discrete categories that are spaced apart. The effect of a high context-driven factor, such as p=10, is that the similarity relationship (esw) between the Apps has a much stronger effect on the value given to the edges of the graph. See the equation below where the edge similarity weight increases by the factor, p, the context-driven factor, whereas, the edge transition weight is inversely affected.

$$w(A \to B; p) \equiv esw(A, B)^p \cdot etw(A \to B)^{1/p}$$

An example of a keyword that yields the context-driven factor, p=10 is the keyword "biology," which implies a strong topic dependency. Therefore good search results should provide Apps that are similar to the topic of biology.

In the graph p=1, the Apps are still grouped in clusters by category, but the category clusters are less concentrated and the different categories are closer together such that there is significant overlap in the boundaries of clusters of different categories.

An example of a keyword that yields the context-driven factor, p=1 is the keyword "INSTAGRAM," which implies less topic dependency and as one of the most popular Apps also has an influence relationship over other apps. Therefore good search results should provide Apps that are similar to social networking, photos, and other Apps that are popular in general.

The graph p=5 reflects a middle ground. The Apps are still grouped in clusters by category, but the category clusters are less concentrated than in the p=10 graph but more concentrated than in the p=1 graph and the different categories are closer together than in the p=10 graph, but far enough that there are still distinct boundaries of clusters of different categories.

An example of a keyword that yields the context-driven factor, p=5 is the keyword "health," which implies less topic dependency than biology but also has a strong topic relevance.

FIG. 6 illustrates a listing of search results when the context-driven factor, p, is p=1, p=5, and p=10.

FIG. 7 illustrates the impact of the context-driven factor, p on search results relevant to the keyword, "biology." As illustrated when p=1, various highly popular Apps such as SNAPCHAT, INSTAGRAM, FACEBOOK, and MESSENGER are ranked highly in the search results even though they are not topic dependent. Meanwhile, a highly similar App to the topic biology, CASE FILES MICROBIOLOGY, was not ranked highly when p=1. In contrast, when p=10, the highly popular Apps are not ranked at all and CASE FILES MICROBIOLOGY is ranked in the top 5.

FIG. 8 illustrates the impact of the context-driven factor, p on search results relevant to the keyword, "FACEBOOK." FACEBOOK is one of the most downloaded Apps and has a relationship with a number of other popular apps. As illustrated when p=1, highly popular Apps such as SNAPCHAT, INSTAGRAM, FACEBOOK, TIKTOK, WHATSAPP, MESSENGER, YOUTUBE, AND TWITTER are ranked highly in the search results. Meanwhile, FACEBOOK isn't even ranked in the top 10 when p=10 even though FACEBOOK was the search term. Further, other top results such as TIKTOK, WHATSAPP, MESSENGER, YOUTUBE, AND TWITTER do not appear in the most relevant results.

Collectively, FIG. 7 and FIG. 8 illustrate the importance of the context-driven factor in coming up with a good result set. For some searches, the influence relationships between Apps are just as important as the similarity relationships between the Apps. Yet, this is challenging, because unlike webpages, Apps and other content items do not include links to exhibit the content items to which they have influence relationships. Fortunately, the present technology is able to derive these influence relationships as explained herein.

Figure 9:
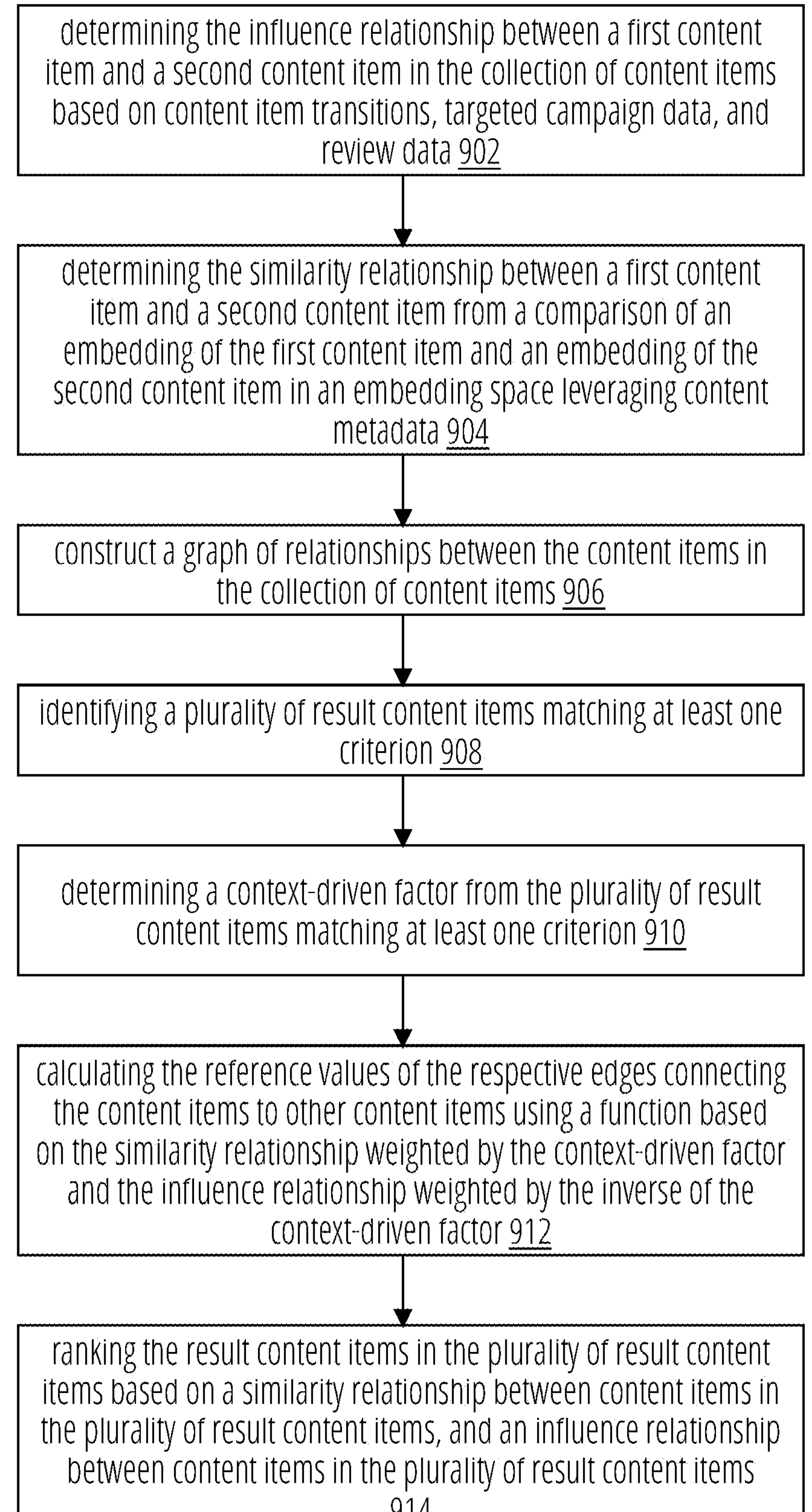
FIG. 9 illustrates an example routine for ranking content items based on similarity relationships and influence relationships, where the weight given to the similarity relationships and influence relationships is dependent on the context of the search terms, cross-references between content items, and potential relevant search results in accordance with some aspects of the present technology.

FIG. 9 illustrates an example routine for ranking content items based similarity relationships and influence relationships, where the weight given to the similarity relationships and influence relationships is dependent on the context of the search terms and potential relevant search results. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes determining an influence relationship between a first content item and a second content item in the collection of content items based on content item transitions, targeted campaign data, and review data at block 902. For example, the content ranking service 102 illustrated in FIG. 1 may determine the influence relationship between a first content item and a second content item in the collection of content items.

In some embodiments, the content item transitions are determined from aggregated sequence data of content item transitions, wherein a first content item has a stronger influence relationship on a second content item when users transition to the second content item recently after interacting with the first content item more frequently than other content items in the aggregated sequence data.

In some embodiments, the targeted campaign data is determined from aggregated targeted campaign data, wherein a first content item has a stronger influence relationship on a second content item when targeted campaign data associated with the second content item targets users of the first content item more frequently than other content items in the aggregated targeted campaign data.

In some embodiments, the review data is determined from aggregated review data, wherein a first content item has a stronger influence relationship on a second content item when first review data associated with the first content item references the second content item more frequently than other content items in the aggregated review data.

According to some examples, the method includes determining a similarity relationship between a first content item and a second content item from a comparison of an embedding of the first content item and an embedding of the second content item in an embedding space leveraging content metadata at block 904. For example, the content ranking service 102 illustrated in FIG. 1 may determine the similarity relationship between a first content item and a second content item. In some embodiments, the embeddings in the embedding space are derived from a title, a description, a user review, and a user rating of the content item.

According to some examples, the method includes constructing a graph of relationships between the content items in the collection of content items at block 906. For example, the content ranking service 102 illustrated in FIG. 1 may construct a graph of relationships between the content items in the collection of content items based on the influence relationships and the similarity relationships. The edges connecting content items to other content items are defined by a relevance value that represents the relevance of the connected content items, the relevance value being made up of the similarity relationship and the influence relationship, where each of the similarity relationship and the influence relationship is modified by a context-driven factor that is calculated from the context of search inputs that give rise to the need for the content item ranking.

After the graph has been created, the content ranking service 102 can use the graph to provide relevance rankings based on search criteria.

According to some examples, the method includes identifying a plurality of result content items matching at least one criterion at block 908. For example, the content ranking service 102 illustrated in FIG. 1 may identify a plurality of result content items matching at least one criterion. The plurality of result content items is identified from content items in a collection of content items.

According to some examples, the method includes determining a context-driven factor based on the plurality of result content items matching at least one criterion at block 910. For example, the content ranking service 102 illustrated in FIG. 1 may determine a context-driven factor from the plurality of result content items matching the at least one criterion.

The context-driven factor is a quantification of the popularity of at least one content item in the plurality of result content items matching at least one criterion. The context-driven factor is smaller when the at least one content item in the plurality of result content items matching at least one criterion is more popular. The context-driven factor can be used to calculate the edge values for the edges in the graph.

According to some examples, the method includes calculating the reference values of the respective edges connecting the content items to other content items using a function based on the similarity relationship weighted by the context-driven factor and the influence relationship weighted by the inverse of the context-driven factor at block 912. For example, the content ranking service 102 illustrated in FIG. 1 may calculate the reference values of the respective edges connecting the content items to other content items. The reference value for a first respective edge will be influenced more by the influence relationship when the at least one content item in the plurality of result content items matching at least one criterion are more popular, and the reference value for a first respective edge will be influenced less by the influence relationship when the at least one content item in the plurality of result content items matching at least one criterion are less popular. More specifically, the similarity relationship component of the edge value is weighted by the context-driven factor and the influence relationship component of the edge value is weighted by the inverse of the context-driven factor. The edge values can be used when ranking the relevance of result content items.

According to some examples, the method includes ranking the result content items in the plurality of result content items based on a similarity relationship between content items in the plurality of result content items, and an influence relationship between content items in the plurality of result content items at block 914. For example, the content ranking service 102 illustrated in FIG. 1 may rank the result content items in the plurality of result content items.

While several of the examples provided herein refer to Apps that are ranked for relevance to keywords, these examples should not be considered limiting. Rather, the present technology is equally applicable to the ranking of any content that does not include explicit influence relationships to other content items and/or for which the ranking of the relevance of the content items to criteria based on influence relationships and similarity relationships can vary based on the context of the criteria.

When the present technology is utilized to rank the relevance of a content item other than an App, some alterations from the above description might be required. For example, while the method described above to determine similarity relationships for content items can be used as described above for Apps, different embeddings and a different embedding space might be required to determine the similarity between music, advertisements, video, and/or social media posts.

In another example, while the method described above regarding using influence relationships can be used as described above for Apps, different signals might imply the influence relationships between music, advertisements, video, and/or social media posts.

For example, in the case of advertisements, a download sequence is not likely to imply an influence relationship between advertisements because the download sequence for advertisements is chosen by a content delivery system rather than a user, and the sequence chosen by the content delivery system has more to do with the inputs requesting an advertisement than the decisions made by the content delivery system. Accordingly, influence relationships amongst advertisements might be derived from common relationships between advertisements and the content to which the advertisements are targeted.

Another way that influence relationships might be derived for advertisements might apply to subsets of advertisements as opposed to all advertisements, generally. For example, advertisements might be divided into advertisements by category (e.g., advertisements for beverages, cars, Apps, movies, etc.). In such instances, the influence relationships within a category might be imputed from the influence relationships of the advertised product. For example, as described herein, it is possible to determine the influence relationship amongst Apps and these influence relationships can be imputed to the advertisements for those Apps. In other words, an advertisement for TWITTER can have the same influence relationship to an advertisement for INSTAGRAM as between the Apps for TWITTER and INSTAGRAM.

While these might be some ways of deriving influence relationships amongst advertisements this should not be considered limiting and other ways might be possible.

Likewise, in the case of social media accounts, the influence relationship between one user account of a social network on another user account of the social network can be derived from a sequence in which user accounts are followed. For example, if aggregated data from users of a social network shows that many users follow user account 1, and thereafter follow user account 2, it can be implied that there is an influence relationship between user account 1 and user account 2. While this might be one way of deriving influence relationships amongst social network user accounts, this should not be considered limiting and other ways might be possible.

Figure 10:
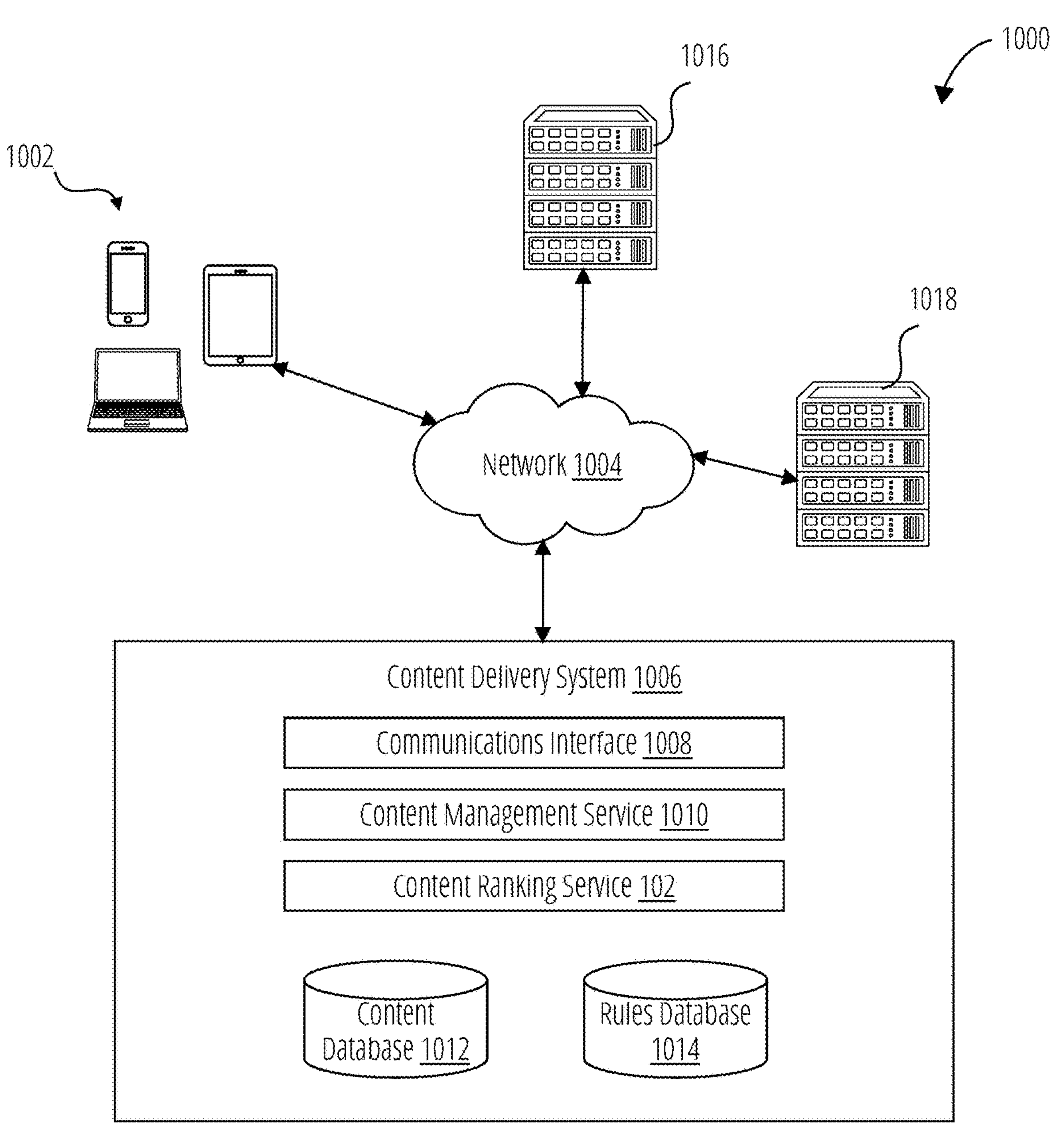
FIG. 10 illustrates an example system configuration for the delivery of content, for example, invitational content in accordance with aspects of the present technology.

FIG. 10 illustrates an example system 1000 configuration for the delivery of content, for example invitational content, wherein electronic devices communicate via a network for purposes of exchanging content and other data. The system can be configured for use on a wide area network such as that illustrated in FIG. 10. However, the present principles are applicable to a wide variety of network configurations that facilitate the intercommunication of electronic devices. For example, each of the components of system 1000 in FIG. 10 can be implemented in a localized or distributed fashion in a network.

In system 1000, invitational content can be delivered to user terminals 1002 connected to a network 1004 by direct and/or indirect communications with a content delivery system 1006. User terminals 1002 can be any network enabled client devices, such as desktop computers, mobile computers, handheld communications devices, e.g. mobile phones, smart phones, tablets, smart televisions, set-top boxes, and/or any other network enabled computing devices. Furthermore, content delivery system 1006 can concurrently accept connections from and interact with multiple user terminals 1002.

The content delivery system 1006 can receive a request for electronic content, such as invitational content to be served with a web page, an application, a media item, etc., from one of user terminals 1002. Thereafter, the content delivery system 1006 can assemble a content package including the invitational content and transmit the assembled content page to the requesting one of user terminals 1002. To facilitate communications with the user terminals 1002 and/or any other device or component, the content delivery system 1006 can include a communications interface 1008.

The content delivery system 1006 can include a content management service 1010 to facilitate the generation of an assembled content package. For example, in the case of invitational content being served and presented with a web page, the content management service 1010 can assemble a content package by requesting the data for the web page from one of the primary content providers 1016 maintaining the web page. The invitational content can be sourced from one of the secondary content providers 1018. The content management service 1010 can request the appropriate invitational content based on the configuration of parameters that guide serving of the invitational content.

The content delivery system 1006 may also include interface with content ranking service 102 to assist in the selection of invitational content to serve. When multiple candidate items of invitational content are configured to be served based on keywords or other attributes received from a user terminal 1002, the content management service 1010 may input key words or images extracted from the request from user terminal 1002 to content ranking service 102. content ranking service 102 may output rankings of invitational content associated with the keywords or other attributes to assist the content management service 1010 in selecting one of the candidate items of invitational content to serve.

In some configurations, the content ranking service 102 might be incorporated into the content delivery system 1006, as illustrated in FIG. 10, or may be a stand-alone service accessible by the secondary content providers 1018 or the content delivery system 1006. For example the content ranking service 102 can be a service used to create invitational content rather than to serve invitational content.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

Although primary content providers 1016 and secondary content providers 1018 are presented herein as separate entities, this is for illustrative purposes. In some cases, the primary content providers 1016 and secondary content providers 1018 can be the same entity. Thus, a single entity can provide both the primary and the secondary content. In one example, an App developer can provide a first App that requests invitational content, and the App developer can create invitational content advertising a second App where the invitational content is presented with the first App.

The content management service 1010 can be configured to request that content be sent directly from primary content providers 1016 and secondary content providers 1018. Alternatively, a cached arrangement can also be used to improve performance of the content delivery system 1006 and improve overall user experience. That is, the content delivery system 1006 can include a content database 1012 for locally storing/caching content maintained by primary content providers 1016 and secondary content providers 1018. The data in the content database 1012 can be refreshed or updated on a regular basis to ensure that the content in the content database 1012 is up to date at the time of a request from a user terminal 1002. However, in some cases, the content management service 1010 can be configured to retrieve content directly from primary content providers 1016, and secondary content providers 1018 if the metadata associated with the data in the content database 1012 appears to be outdated or corrupted.

As described above, content maintained by the primary content providers 1016 and secondary content providers 1018 can be combined according to a predefined arrangement between the two content providers, which can be embodied as a set of rules. In an arrangement where the content delivery system 1006 assembles the content package from multiple content providers, the assembly rules can be stored in a rules database 1014 in the content delivery system 1006. The content management service 1010 can be configured to assemble the content package for user terminals 1002 based on these rules. The rules can specify how to select content from secondary content providers 1018 and primary content providers 1016 in response to a request from one of user terminals 1002. For example, in the case of a web page maintained by one of primary content providers 1016, the rules database 1014 can specify rules for selecting one of the secondary content providers 1018. The rules can also specify how to select specific content from the selected one of secondary content providers 1018 to be combined with the content provided by one of primary content providers 1016. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 1002.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 1002. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, CA, the collected data could include the user's registration information. Such data can provide values for declared user characteristics. Furthermore, the content delivery system 1006 can be configured to learn of or derive user characteristics from any number of other information sources. For example, in some configurations, the content delivery system 1006 can derive or infer one or more user characteristic values from user characteristic values already known about the user.

Figure 11:
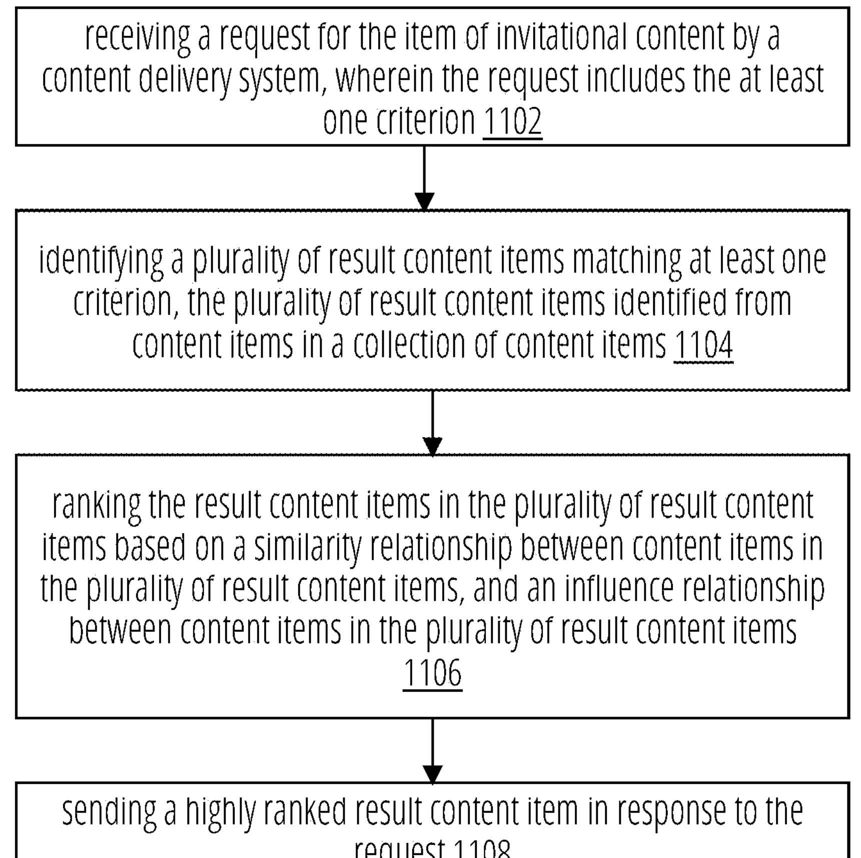
FIG. 11 illustrates an example routine for selecting an item of invitational content to serve in response to a request for invitational content based on the relevance of the invitational content to keywords or other attributes in accordance with some aspects of the present technology.

FIG. 11 illustrates an example routine for selecting an item of invitational content to serve in response to a request for invitational content based on the relevance of the invitational content to keywords or other attributes. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving a request for the item of invitational content by a content delivery system, wherein the request includes the at least one criterion at block 1102.

According to some examples, the method includes identifying a plurality of result invitational content items matching the at least one criterion, the plurality of result invitational content items identified from content items in a collection of content items at block 1104. For example, the content ranking service 102 illustrated in FIG. 1 may identify a plurality of candidate invitational content items matching at least one criterion such that they could be served in response to the request for the item of invitational content.

According to some examples, the method includes ranking the candidate invitational content items based on a similarity relationship between invitational content items, and an influence relationship between invitational content items at block 1106. For example, the content ranking service 102 illustrated in FIG. 1 may rank the candidate invitational content items. As explained herein the impact of the ranking by the similarity relationship and the influence relationship can be dependent on the context of at least one criterion and the candidate invitational content items.

According to some examples, the method includes sending a highly ranked candidate invitational content item in response to the request at block 1108. For example, the content delivery system 1006 illustrated in FIG. 10 may send a highly ranked candidate invitational content item in response to the request.

FIG. 12 illustrates an example routine for configuring a targeted invitational content campaign. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes providing a user interface to configure a targeted campaign, wherein a first item of invitational content that is configured to invite engagement with a first content item is to be targeted to be presented in association with at least one second content item at block 1202. For example, the content delivery system 1006 illustrated in FIG. 10 may provide a user interface to configure the targeted campaign. For example, an App developer may desire to target invitational content advertising a first App to users using or searching for a second App that is relevant to the first App.

According to some examples, the method includes identifying a plurality of result content items matching at least one criterion, the plurality of result content items identified from content items in a collection of content items at block 1204. For example, the content ranking service 102 illustrated in FIG. 1 may identify a plurality of candidate Apps matching at least one criterion, e.g., that the candidate Apps are similar to the first App.

According to some examples, the method includes ranking the result content items for relevance to the first App based on a similarity relationship between content items in the plurality of result content items and the first App, and an influence relationship between content items and the first App at block 1206. For example, the content ranking service 102 illustrated in FIG. 1 may rank the result content items in the plurality of result content items based on a similarity relationship and an influence relationship. As explained herein the impact of the ranking by the similarity relationship and the influence relationship can be dependent on the context of the first App and the result content items.

According to some examples, the method includes recommending one or more highly ranked content items to be selected, wherein at least one criterion is relevance to the first content item at block 1208. For example, the content delivery system 1006 illustrated in FIG. 10 may recommend one or more highly ranked result content items to be selected as the at least one second content item.

According to some examples, the method includes receiving a selection of the one or more highly ranked content items in the user interface at block 1210. For example, the content delivery system 1006 illustrated in FIG. 10 may receive a selection of the one or more highly ranked content items in the user interface.

According to some examples, the method includes configuring the targeted campaign to serve the first item of invitational content in association with the selected one or more highly ranked content items at block 1212. For example, the content delivery system 1006 illustrated in FIG. 10 may configure the targeted campaign to serve the first item of invitational content in association with the selected one or more highly ranked content items. For example, one of the candidate Apps can be recommended as a target of an invitational content campaign whereby the invitational content advertising the first App can be targeted to users using or searching for the selected one of the candidate Apps.

Figure 13:
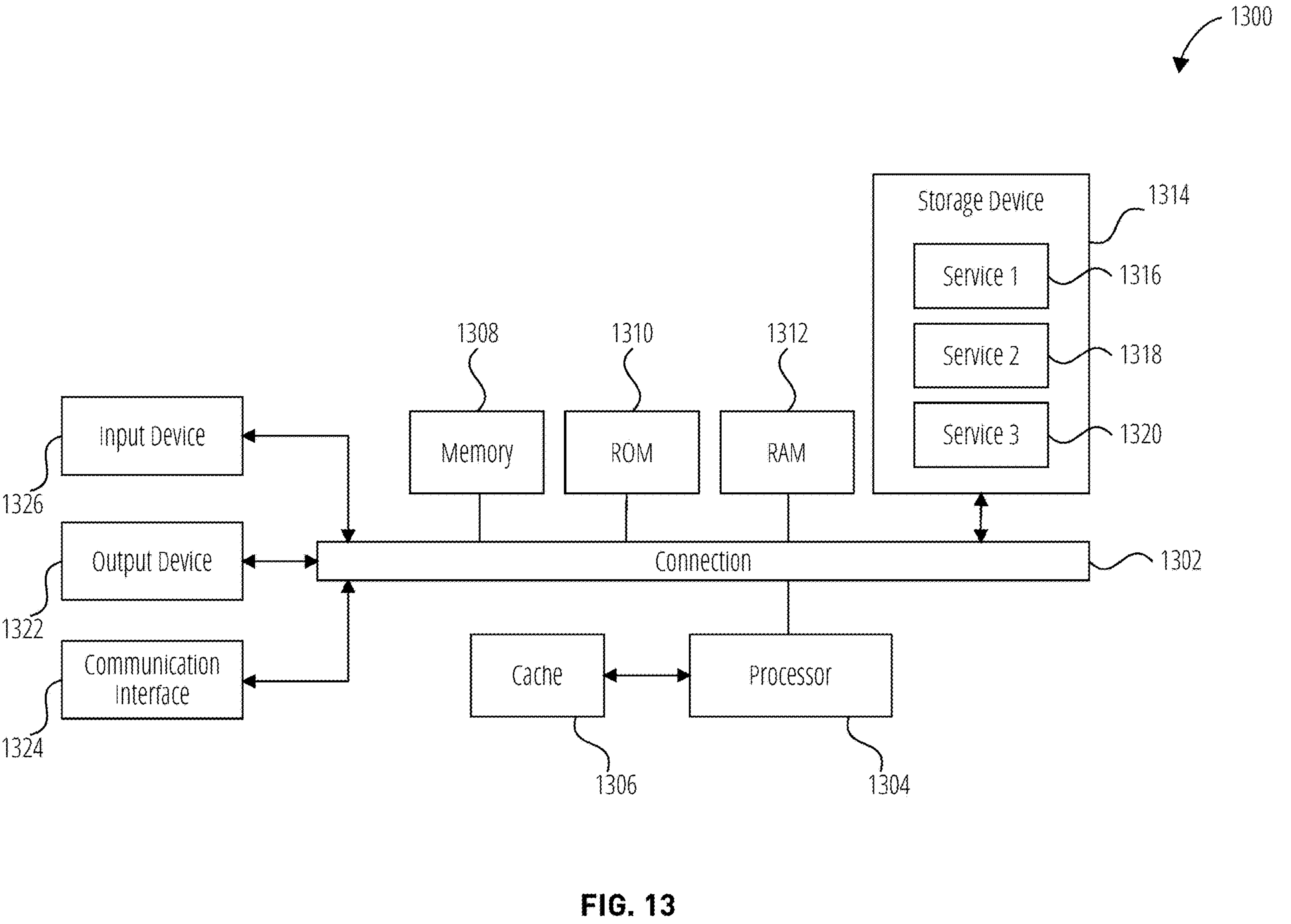
FIG. 13 shows an example of a system for implementing certain aspects of the present technology.

FIG. 13 shows an example of computing system 1300, which can be for example any computing device making up the content ranking service 102, or any component thereof in which the components of the system are in communication with each other using connection 1302. Connection 1302 can be a physical connection via a bus, or a direct connection into processor 1304, such as in a chipset architecture. Connection 1302 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1300 includes at least one processing unit (CPU or processor) 1304 and connection 1302 that couples various system components including system memory 1308, such as read-only memory (ROM) 1310 and random access memory (RAM) 1312 to processor 1304. Computing system 1300 can include a cache of high-speed memory 1306 connected directly with, in close proximity to, or integrated as part of processor 1304.

Processor 1304 can include any general purpose processor and a hardware service or software service, such as services 1316, 1318, and 1320 stored in storage device 1314, configured to control processor 1304 as well as a special-purpose processor where software instructions are incorporated into the actual processor design. Processor 1304 may essentially be a completely self-contained computing system, containing multiple cores or processors, a bus, memory controller, cache, etc. A multi-core processor may be symmetric or asymmetric.

To enable user interaction, computing system 1300 includes an input device 1326, which can represent any number of input mechanisms, such as a microphone for speech, a touch-sensitive screen for gesture or graphical input, keyboard, mouse, motion input, speech, etc. Computing system 1300 can also include output device 1322, which can be one or more of a number of output mechanisms known to those of skill in the art. In some instances, multimodal systems can enable a user to provide multiple types of input/output to communicate with computing system 1300. Computing system 1300 can include communication interface 1324, which can generally govern and manage the user input and system output. There is no restriction on operating on any particular hardware arrangement, and therefore the basic features here may easily be substituted for improved hardware or firmware arrangements as they are developed.

Storage device 1314 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1314 can include software services, servers, services, etc., that when the code that defines such software is executed by the processor 1304, it causes the system to perform a function. In some embodiments, a hardware service that performs a particular function can include the software component stored in a computer-readable medium in connection with the hardware components, such as processor 1304, connection 1302, output device 1322, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hard ware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects of the present technology will be further understood from the following clauses:

Clause 1. A method for ranking content items comprising: identifying a plurality of result content items matching at least one criterion, the plurality of result content items identified from content items in a collection of content items; ranking the content items in the plurality of result content items based on a similarity relationship between the content items in the plurality of result content items, and an influence relationship between the content items in the plurality of result content items.

Clause 2. The method of clause 1, further comprising: determining the influence relationship between a first content item and a second content item in the collection of content items based on content item transitions, targeted campaign data, and review data.

Clause 3. The method of any one of clauses 1-2, further comprising: determining the influence relationship based on aggregated sequence data of content item transitions, wherein a first content item has a stronger influence relationship on a second content item when users transition to the second content item recently after interacting with the first content item more frequently than other content items in the aggregated sequence data.

Clause 4. The method of any one of clauses 1-3, further comprising: determining the influence relationship based on aggregated targeted campaign data, wherein a first content item has a stronger influence relationship on a second content item when targeted campaign data associated with the second content item targets users of the first content item more frequently than other content items in the aggregated targeted campaign data.

Clause 5. The method of any one of clauses 1-4, further comprising: determining the influence relationship based on aggregated review data, wherein a first content item has a stronger influence relationship on a second content item when first review data associated with the first content item references the second content item more frequently than other content items in the aggregated review data.

Clause 6. The method of any one of clauses 1-5, further comprising: determining the similarity relationship between a first content item and a second content item from a comparison of an embedding of the first content item and an embedding of the second content item in an embedding space, where embeddings in the embedding space are derived from a title, a description, a user review, and a user rating of the content items.

Clause 7. The method of any one of clauses 1-6, wherein the content items are items of invitational content, the method further comprising: receiving a request for an item of invitational content by a content delivery system, wherein the request includes the at least one criterion; sending a highly ranked result content item in response to the request.

Clause 8. The method of any one of clauses 1-7, further comprising: providing a user interface to configure a targeted campaign, wherein a first item of invitational content that is configured to invite engagement with a first content item is to be targeted to be presented in association with at least one second content item; recommending one or more highly ranked content items to be selected as the at least one second content item, wherein the at least one criterion is relevance to the first content item.

Clause 9. The method of any one of clauses 1-8, further comprising: receiving a selection of the one or more highly ranked content items in the user interface; and configuring the targeted campaign to serve the first item of invitational content in association with the selected one or more highly ranked content items.

Clause 10. The method of any one of clauses 1-9, comprising: construct a graph of relationships between the content items in the collection of content items, wherein edges connecting the content items to other content items are defined by a relevance value that represents a relevance of the content items connected by the edges, the relevance value being made up of the similarity relationship and the influence relationship.

Clause 11. The method of any one of clauses 1-10, further comprising: determining a context-driven factor from the plurality of result content items matching the at least one criterion; calculating relevance values of respective edges connecting the content items to other content items using a function based on the similarity relationship weighted by the context-driven factor and the influence relationship weighted by the inverse of the context-driven factor.

Clause 12. The method of any one of clauses 1-11, wherein the context-driven factor is a quantification of popularity of at least one content item in the plurality of result content items matching the at least one criterion, and wherein the context-driven factor is smaller when the at least one content item in the plurality of result content items matching the at least one criterion is more popular.

Clause 13. The method of any one of clauses 1-12, wherein the relevance value for a first respective edge will be influenced more by the influence relationship when the at least one content item in the plurality of result content items matching the at least one criterion is more popular, and the relevance value for the first respective edge will be influenced less by the influence relationship when the at least one content item in the plurality of result content items matching the at least one criterion is less popular.

Clause 14. The method of any one of clauses 1-13, further comprising: determining a context-driven factor from the plurality of result content items matching the at least one criterion, wherein when ranking the result content items, the similarity relationship is weighted by the context-driven factor and the influence relationship is weighted by the inverse of the context-driven factor.

What is claimed is:

1. A method for ranking content items by at least one processor and a memory, the method comprising:

identifying a plurality of result content items matching at least one criterion, the plurality of result content items identified from content items in a collection of content items; and ranking the content items in the plurality of result content items based on a similarity relationship between the content items in the plurality of result content items, and an influence relationship between pairs of the content items in the plurality of result content items, wherein:

the similarity relationship between a first content item and a second content item is based on a comparison of embeddings of the first content item and the second content item in an embedding space derived, at least in part, from content metadata; and the influence relationship between the first content item and the second content item is based on aggregated signals indicative that user engagement with the first content item increases a propensity for user engagement with the second content item.

2. The method of claim 1, further comprising:

determining the influence relationship between the pairs of content items in the collection of content items based on content item transitions, targeted campaign data, and review data.

3. The method of claim 1, wherein embeddings in the embedding space are derived from a title, a description, a user review, and a user rating of the content items.

4. The method of claim 1, further comprising:

constructing a graph of relationships between the content items in the collection of content items, wherein edges connecting the content items to other content items are defined by a relevance value that represents a relevance of the content items connected by the edges, the relevance value being made up of the similarity relationship and the influence relationship.

5. The method of claim 1, further comprising:

determining a context-driven factor from the plurality of result content items matching the at least one criterion, wherein when ranking the plurality of result content items, the similarity relationship is weighted by the context-driven factor and the influence relationship is weighted by an inverse of the context-driven factor.

6. The method of claim 1, wherein the content items are items of invitational content, the method further comprising:

receiving a request for an item of invitational content by a content delivery system, wherein the request includes the at least one criterion; and sending a highly ranked result content item in response to the request.

7. The method of claim 1, further comprising:

providing a user interface to configure a targeted campaign, wherein a first item of invitational content that is configured to invite engagement with the first content item is to be targeted to be presented in association with at least one second content item;

recommending one or more highly ranked content items to be selected as the at least one second content item, wherein the at least one criterion is relevance to the first content item;

receiving a selection of the one or more highly ranked content items in the user interface; and configuring the targeted campaign to serve the first item of invitational content in association with the selected one or more highly ranked content items.

8. The method of claim 1, wherein the aggregated signals include aggregated sequence data of content item transitions, wherein the first content item has a stronger influence relationship on the second content item when users transition to the second content item recently after interacting with the first content item more frequently than other content items in the aggregated sequence data.

9. The method of claim 1, wherein the aggregated signals include aggregated targeted campaign data, wherein the first content item has a stronger influence relationship on the second content item when targeted campaign data associated with the second content item targets users of the first content item more frequently than other content items in the aggregated targeted campaign data.

10. The method of claim 1, wherein the aggregated signals include aggregated review data, wherein the first content item has a stronger influence relationship on the second content item when first review data associated with the first content item references the second content item more frequently than other content items in the aggregated review data.

11. The method of claim 1, wherein the influence relationship indicates that a content item is influential when the content item at least one of is referred to by one or more highly influential content items or when the content item bridges discoveries of other content items.

12. A system comprising:

at least one processor; and a memory storing instructions that, when executed by the at least one processor, configures the system to:

identify a plurality of result content items matching at least one criterion, the plurality of result content items identified from content items in a collection of content items;

rank the content items in the plurality of result content items based on a similarity relationship between the content items in the plurality of result content items, and an influence relationship between pairs of the content items in the plurality of result content items, wherein:

the similarity relationship between a first content item and a second content item is based on a comparison of embeddings of the first content item and the second content item in an embedding space derived, at least in part, from content metadata; and the influence relationship between the first content item and the second content item is based on aggregated signals indicative that user engagement with the first content item increases a propensity for user engagement with the second content item.

13. The system of claim 12, wherein the instructions further configure the system to:

determine the influence relationship between the first content item and the second content item in the collection of content items based on content item transitions, targeted campaign data, and review data.

14. The system of claim 12, wherein embeddings in the embedding space are derived from a title, a description, a user review, and a user rating of the content items.

15. The system of claim 12, wherein the instructions further configure the system to:

construct a graph of relationships between the content items in the collection of content items, wherein edges that connect the content items to other content items are defined by a relevance value that represents a relevance of the content items connected by the edges, the relevance value being made up of the similarity relationship and the influence relationship.

16. The system of claim 12, wherein the instructions further configure the system to:

determine a context-driven factor from the plurality of result content items matching the at least one criterion, wherein when ranking the result content items, the similarity relationship is weighted by the context-driven factor and the influence relationship is weighted by an inverse of the context-driven factor.

17. A non-transitory computer-readable storage medium, the non-transitory computer-readable storage medium comprising instructions that when executed, configure at least one processor to:

identify a plurality of result content items matching at least one criterion, the plurality of result content items identified from content items in a collection of content items;

rank the content items in the plurality of result content items based on a similarity relationship between the content items in the plurality of result content items, and an influence relationship between pairs of the content items in the plurality of result content items, wherein the similarity relationship between a first content item and a second content item is based on a comparison of embeddings of the first content item and the second content item in an embedding space derived, at least in part, from content metadata; and the influence relationship between the first content item and the second content item is based on aggregated signals indicative that user engagement with the first content item increases a propensity for user engagement with the second content item.

18. The non-transitory computer-readable storage medium of claim 17, wherein the instructions further configure the at least one processor to:

determine the influence relationship between he first content item and the second content item in the collection of content items based on content item transitions, targeted campaign data, and review data.

19. The non-transitory computer-readable storage medium of claim 17, wherein embeddings in the embedding space are derived from a title, a description, a user review, and a user rating of the content items.

20. The non-transitory computer-readable storage medium of claim 17, wherein the instructions further configure the at least one processor to:

construct a graph of relationships between the content items in the collection of content items, wherein edges that connect the content items to other content items are defined by a relevance value that represents a relevance of the content items connected by the edges, the relevance value being made up of the similarity relationship and the influence relationship.

21. The non-transitory computer-readable storage medium of claim 17, wherein the instructions further configure the at least one processor to:

determine a context-driven factor from the plurality of result content items matching the at least one criterion, wherein when ranking the result content items, the similarity relationship is weighted by the context-driven factor and the influence relationship is weighted by an inverse of the context-driven factor.

* * * * *